(12) United States Patent
Ng et al.

(10) Patent No.: US 9,771,443 B2
(45) Date of Patent: *Sep. 26, 2017

(54) CHAIN TRANSFER AGENT FOR ADDITION MASS POLYMERIZATION OF POLYCYCLOOLEFINIC MONOMERS

(71) Applicant: PROMERUS, LLC, Brecksville, OH (US)

(72) Inventors: Hendra Ng, Brecksville, OH (US); Keitaro Seto, Brecksville, OH (US); Wei Zhang, Brecksville, OH (US)

(73) Assignee: PROMERUS, LLC, Brecksville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,185

(22) Filed: Mar. 31, 2016

(65) Prior Publication Data

US 2016/0289353 A1    Oct. 6, 2016

Related U.S. Application Data

(60) Provisional application No. 62/140,514, filed on Mar. 31, 2015.

(51) Int. Cl.
*C08F 132/08*   (2006.01)
*C08F 2/02*    (2006.01)
*C08F 2/38*    (2006.01)

(52) U.S. Cl.
CPC .............. *C08F 132/08* (2013.01); *C08F 2/02* (2013.01); *C08F 2/38* (2013.01)

(58) Field of Classification Search
None
See application file for complete search history.

(56) References Cited

U.S. PATENT DOCUMENTS

| 5,468,819 | A  | 11/1995 | Goodall et al. |
| 8,030,424 | B2 | 10/2011 | Novak et al. |
| 2007/0066775 | A1 | 3/2007 | Rhodes et al. |

OTHER PUBLICATIONS

Seto et al., "A copolymerization of bicyclo[4.2.0]oct-7-ene and norbornene," Polym. Prepr., 2008, 49(2), 681-682.*
International Search Report issued in PCT/US2016/025113, published as WO2016/161049 A1, dated Oct. 6, 2016.
Written Opinion issued in PCT/US2016/025113, published as WO2016/161049 A1, dated Oct. 6, 2016.

* cited by examiner

*Primary Examiner* — Catherine S Branch
(74) *Attorney, Agent, or Firm* — Balaram Gupta

(57) ABSTRACT

The present invention relates to use of certain chain transfer agents to control molecular weight of addition mass polymerization of certain polycycloolefinic monomers. More specifically, the present invention relates to use of a series of substituted bicycloalkenes as chain transfer agents in the addition mass polymerization of a series of functionalized norbornene-type monomers. This invention also relates to compositions containing bicycloalkenes as chain transfer agents in forming "in mold" polycycloolefinic polymers by addition mass polymerization.

20 Claims, 1 Drawing Sheet

CHAIN TRANSFER AGENT FOR ADDITION MASS POLYMERIZATION OF POLYCYCLOOLEFINIC MONOMERS

CROSS REFERENCE TO RELATED APPLICATIONS

This application claims the benefit of U.S. Provisional Application No. 62/140,514, filed Mar. 31, 2015, which is incorporated herein by reference in its entirety.

BACKGROUND OF THE INVENTION

Field of the Invention

The present invention relates to use of certain chain transfer agents to control molecular weight of addition mass polymerization of certain polycycloolefinic monomers. More specifically, the present invention relates to use of a series of substituted bicycloalkenes as chain transfer agents in the addition mass polymerization of a series of functionalized norbornene-type monomers. This invention also relates to compositions containing bicycloalkenes as chain transfer agents in forming "in mold" polycycloolefinic polymers by addition mass polymerization.

Description of the Art

Cyclic olefin polymers, such as polynorbornenes (PNBs), are widely used in a variety of electronic, optoelectronic and other applications, and therefore, methods of making such PNBs in an industrial scale are of importance. It is well known in the literature that various functionalized PNBs can be synthesized by employing suitable starting norbornene monomers by addition polymerization using a variety of transition metal catalysts and procatalysts. See for example, U.S. Pat. No. 7,989,570, pertinent portions of which are incorporated herein by reference.

It is also known in the literature that certain of the aforementioned vinyl addition polymerization methods result in very high molecular weight polymers, which may not always be desirable, such as for example, high molecular weight polymers become less soluble in commonly used solvents, and therefore, can't be used in many applications involving any solvent based compositions. Accordingly, it has been reported in the literature that certain chain transfer agents can be used in the vinyl addition polymerization methods in order to control the molecular weight. See for example, U.S. Pat. No. 5,468,819, where it is disclosed use of an olefinic chain transfer agent to control the molecular weight of an addition polymer in solution. Similarly, U.S. Pat. No. 7,759,439 and U.S. Pat. No. 7,863,394 disclose respectively use of formic acid and non-olefinic compound (such as silane, germane and stannane) as chain transfer agent in solution phase addition polymerization.

In some applications, such as, electronics applications, the polymer formed from the addition solution polymerization must undergo several process steps which involve removing the metal catalyst and the solvent. This further may involve different polymerization solvent and carrier solvent for the compositions employed in the electronic applications. These additional steps also create considerable amounts of solid and liquid waste which needs to be disposed, which are environmentally not friendly and also expensive.

Accordingly, there is a need to develop a method to mass addition polymerization of polycycloolefinic monomers such that controlled molecular weight polymers can be prepared without adversely affecting the reactivity and final monomer conversion. More importantly, such polymers are formed without the use of any solvents, and should feature good thermal and mechanical properties.

Accordingly, it is an object of this invention to provide a series of bicycloalkenes having utility as chain transfer agents in mass addition polymerization of a variety of cycloolefinic monomers.

It is also an object of this invention to provide compositions to form controlled molecular weight polymers by mass addition polymerization techniques as disclosed herein.

Other objects and further scope of the applicability of the present invention will become apparent from the detailed description that follows.

SUMMARY OF THE INVENTION

Surprisingly, it has now been found that certain of the non-polar organic molecules and more specifically a series of substituted bicycloalkenes offer unique advantages as chain transfer agents to mass polymerize a variety of cyclic olefin monomers including but not limited to a variety of functionalized norbornene monomers. Among some of the advantages offered by these chain transfer agents (CTAs) include but are not limited to a) reducing the amount of the initiator to form the final polymer having very low levels of any residual metal initiator; b) controlling polymerization activity of the organo-metallic initiators employed; c) effective in reducing the molecular weight of the resulting polycycloolefinic polymers; d) readily tailorable to the required molecular weight of the polymer by controlling the reaction kinetics thereby resulting in minimum adverse effects on reaction kinetics and monomer conversion; e) low dielectric polymers can be formed; among others. In some aspects, the chain transfer agents as employed herein offers unique methods to form polymers exhibiting excellent fire retardant properties. In other aspects of this invention, the CTAs as employed herein provides hitherto unobtainable melt processable polycycloolefinic polymers. In further aspects of this invention, the CTAs of this invention provides for telechelic oligomeric and/or polymeric materials with end group functionalities having utility in various other applications.

Accordingly, there is provided a reaction composition comprising:
a compound of formula (I):

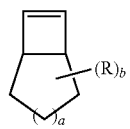
(I)

wherein
a is an integer from 0 to 4;
b is an integer from 0 to 2a+4;
each R is hydrogen, halogen, methyl, ethyl, linear or branched $(C_3-C_6)$alkyl, substituted or unsubstituted $(C_3-C_7)$cycloalkyl, $(C_6-C_{10})$aryl, $(C_6-C_{10})$aralkyl, methoxy, ethoxy, linear or branched $(C_3-C_6)$alkoxy, substituted or unsubstituted $(C_3-C_7)$cycloalkoxy, $(C_6-C_{10})$aryloxy and $(C_6-C_{10})$aralkyloxy;
one or more polycyclic olefin monomers; and
an organo-transition metal compound.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION

Figure 1:
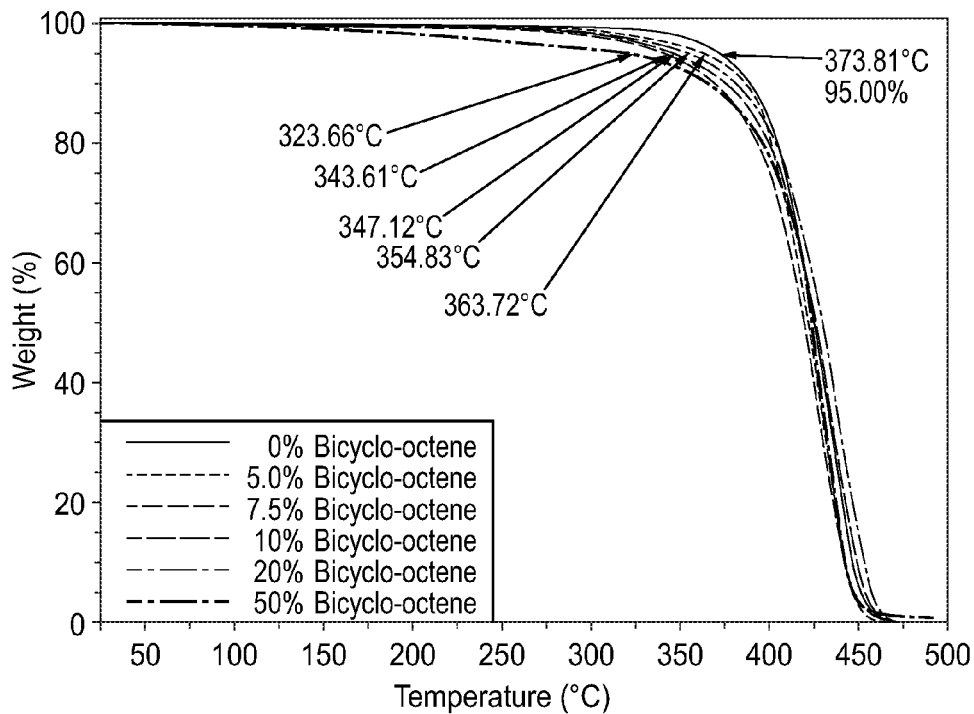
FIG. 1 shows a thermogram from thermogravimetric analysis (TGA) of a composition in accordance with one of the embodiments of the invention.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "〜" denotes a position at which the bonding takes place with another repeat unit or another atom or molecule or group or moiety as appropriate with the structure of the group as shown.

As used herein, "hydrocarbyl" refers to a radical of a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "$(C_1$-$C_6)$alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "$(C_1$-$C_4)$alkoxy", "$(C_1$-$C_4)$thioalkyl" "$(C_1$-$C_4)$alkoxy$(C_1$-$C_4)$alkyl", "hydroxy$(C_1$-$C_4)$alkyl", "$(C_1$-$C_4)$alkylcarbonyl", "$(C_1$-$C_4)$alkoxycarbonyl$(C_1$-$C_4)$alkyl", "$(C_1$-$C_4)$alkoxycarbonyl", "amino$(C_1$-$C_4)$alkyl", "$(C_1$-$C_4)$alkylamino", "$(C_1$-$C_4)$alkylcarbamoyl$(C_1$-$C_4)$alkyl", "$(C_1$-$C_4)$dialkylcarbamoyl$(C_1$-$C_4)$alkyl" "mono- or di-$(C_1$-$C_4)$alkylamino$(C_1$-$C_4)$alkyl", "amino$(C_1$-$C_4)$alkylcarbonyl" "diphenyl$(C_1$-$C_4)$alkyl", "phenyl$(C_1$-$C_4)$alkyl", "phenylcarboyl$(C_1$-$C_4)$alkyl" and "phenoxy$(C_1$-$C_4)$alkyl" are to be construed accordingly.

As used herein, the expression "cycloalkyl" includes all of the known cyclic radicals. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_2$-$C_6)$alkenyl" includes ethenyl and straight-chained or branched propenyl, butenyl, pentenyl and hexenyl groups. Similarly, the expression "$(C_2$-$C_6)$alkynyl" includes ethynyl and propynyl, and straight-chained or branched butynyl, pentynyl and hexynyl groups.

As used herein the expression "$(C_1$-$C_4)$acyl" shall have the same meaning as "$(C_1$-$C_4)$alkanoyl", which can also be represented structurally as "R—CO—," where R is a $(C_1$-$C_3)$alkyl as defined herein. Additionally, "$(C_1$-$C_3)$alkylcarbonyl" shall mean same as $(C_1$-$C_4)$acyl. Specifically, "$(C_1$-$C_4)$acyl" shall mean formyl, acetyl or ethanoyl, propanoyl, n-butanoyl, etc. Derived expressions such as "$(C_1$-$C_4)$acyloxy" and "$(C_1$-$C_4)$acyloxyalkyl" are to be construed accordingly.

As used herein, the expression "$(C_1$-$C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1$-$C_6)$perfluoroalkoxy", is to be construed accordingly.

As used herein, the expression "$(C_6$-$C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art. Derived expression, "$(C_6$-$C_{10})$arylsulfonyl," is to be construed accordingly.

As used herein, the expression "$(C_6$-$C_{10})$aryl$(C_1$-$C_4)$alkyl" means that the $(C_6$-$C_{10})$aryl as defined herein is further attached to $(C_1$-$C_4)$alkyl as defined herein. Representative examples include benzyl, phenylethyl, 2-phenylpropyl, 1-naphthylmethyl, 2-naphthylmethyl and the like. It should be further noted that the expressions "arylalkyl" and "aralkyl" mean the same are used interchangeably. Accordingly, the expression "$(C_6$-$C_{10})$aryl$(C_1$-$C_4)$alkyl" can also be construed as "$(C_6$-$C_{14})$aralkyl."

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $C_{1-6}$ alkyl, $C_{2-6}$alkenyl, $C_{1-6}$ perfluoroalkyl, phenyl, hydroxy, —$CO_2H$, an ester, an amide, $C_1$-$C_6$alkoxy, $C_1$-$C_6$thioalkyl, $C_1$-$C_6$perfluoroalkoxy, —$NH_2$, Cl, Br, I, F, —NH-lower alkyl, and —N(lower alkyl)$_2$. However, any of the other suitable substituents known to one skilled in the art can also be used in these embodiments.

As used herein "mass addition polymerization" means polymerizing one or more olefinic monomers neat without any solvent. It also includes other terms used in the art such as "bulk" polymerization or "in-mold" polymerization, and the like, in each of such methods no solvent is employed. However, the initiator/catalyst can be dissolved in some other solvent and/or in the monomer itself to initiate such "mass addition polymerization" methods as described herein.

As used herein "telechelic polymer" means a polymer having one or more reactive end groups which is available for reacting with another reactant.

It should be noted that any atom with unsatisfied valences in the text, schemes, examples and tables herein is assumed to have the appropriate number of hydrogen atom(s) to satisfy such valences.

By the term, "a monomer repeat unit is derived" is meant that the polymeric repeating units are polymerized (formed) from, e.g., polycyclic norbornene-type monomers, wherein the resulting polymers are formed by 2,3 enchainment of norbornene-type monomers as shown below:

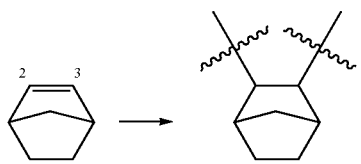

Surprisingly, it has now been found that certain of the bicycloalkenes of formula (I) as described herein facilitates remarkably mass polymerization of a variety of polycycloolefin monomers.

Accordingly, there is provided a reaction composition comprising:

a compound of formula (I):

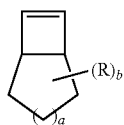

wherein a is an integer from 0 to 4;

b is an integer from 0 to 2a+4;

each R is hydrogen, halogen, methyl, ethyl, linear or branched $(C_3-C_6)$alkyl, substituted or unsubstituted $(C_3-C_7)$cycloalkyl, $(C_6-C_{10})$aryl, $(C_6-C_{10})$aralkyl, methoxy, ethoxy, linear or branched $(C_3-C_6)$alkoxy, substituted or unsubstituted $(C_3-C_7)$cycloalkoxy, $(C_6-C_{10})$aryloxy and $(C_6-C_{10})$aralkyloxy;

one or more polycyclic olefin monomers; and an organo-transition metal compound.

The compounds of formula (I) generally function as an effective chain transfer agent during mass polymerization of one or more monomers as described herein. Accordingly, any of the compounds of formula (I) can be used in this invention which brings about the effects of chain transfer property. Surprisingly, it has now been found that any of the bicycloalkenes which have a ring strain such that it acts effectively as a chain transfer agent can be used. However, it should be noted that various other known mono- or polycycloolefinic compounds having a ring strain energy greater than 17 kcal/mole are also suitable as chain transfer agents for mass polymerization of certain polycyclic olefin monomers of formula (II) as described hereinbelow. Examples of such olefins include trans-cyclooctene, norbornene, cyclobutene and the like. More specifically, compounds of formula (I) are found to be effective as chain transfer agents for the polymerization of certain polycyclic olefin monomers of formula (II).

The compounds of formula (I) can be synthesized by any of the procedures known to one skilled in the art. Specifically, some of the compounds of formula (I) are known in the literature and others can be prepared by methods used to prepare similar compounds as reported in the literature and as further described herein.

More specifically, the compounds of formula (I) as disclosed herein can be synthesized according to the following procedures of Scheme 1, wherein a, b and R are as defined for Formula I unless otherwise indicated.

Scheme I

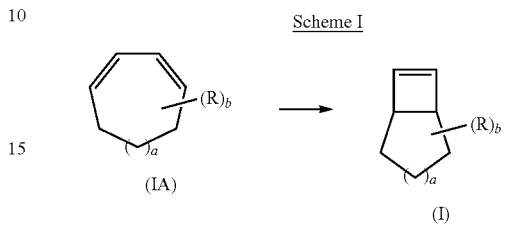

In general, in Scheme I, the compound of formula (IA) is subjected to suitable reaction conditions to form a compound of formula (I) in the presence of a suitable solvent. Such reaction conditions that may be suitable for such conversions include photolytic or thermolytic reaction conditions. It has been reported in the literature that compounds of formula (IA) can conveniently be converted to compounds of formula (I) by subjecting it to suitable photolysis in the presence of a hydrocarbon solvent such as heptane. See, for example, Liu, Robert S. H., Journal of American Chemical Society (1967), 89(1), 112-114. However, any other reaction condition that is known to one skill in the art to make the compounds of formula (I) can also be employed.

One or more non-limiting examples of compound of formula (I), where a=0, is selected from the group consisting of:

bicyclo[2.2.0]hex-2-ene;
5-methylbicyclo[2.2.0]hex-2-ene; and
5,6-dimethylbicyclo[2.2.0]hex-2-ene.

One or more non-limiting examples of compound of formula (I), where a=1 to 4, is selected from the group consisting of:

bicyclo[3.2.0]hept-6-ene;
2-methylbicyclo[3.2.0]hept-6-ene;
2,4-dimethylbicyclo[3.2.0]hept-6-ene;
2,4,6-trimethylbicyclo[3.2.0]hept-6-ene;
bicyclo[4.2.0]oct-7-ene;
2-methylbicyclo[4.2.0]oct-7-ene;
3-methylbicyclo[4.2.0]oct-7-ene;
2,3-dimethylbicyclo[4.2.0]oct-7-ene;
2,3,5-trimethylbicyclo[4.2.0]oct-7-ene;
2,3,4,5-tetramethylbicyclo[4.2.0]oct-7-ene;
bicyclo[5.2.0]non-8-ene;
2-methylbicyclo[5.2.0]non-8-ene;
2,5-dimethylbicyclo[5.2.0]non-8-ene;
bicyclo[6.2.0]dec-9-ene; and
2-methylbicyclo[6.2.0]dec-9-ene.

In another embodiment the reaction composition of this invention encompasses a compound of formula (I) selected from the group consisting of:

bicyclo[3.2.0]hept-6-ene;
bicyclo[4.2.0]oct-7-ene;
bicyclo[5.2.0]non-8-ene; and
bicyclo[6.2.0]dec-9-ene.

In yet another embodiment the composition of this invention encompasses a compound of formula (I) selected from the group consisting of:

bicyclo[4.2.0]oct-7-ene;
2-methylbicyclo[4.2.0]oct-7-ene;
3-methylbicyclo[4.2.0]oct-7-ene;
2,3-dimethylbicyclo[4.2.0]oct-7-ene;
2,3,5-trimethylbicyclo[4.2.0]oct-7-ene; and
2,3,4,5-tetramethylbicyclo[4.2.0]oct-7-ene.

In a further aspect of this invention, any of the polycyclic olefin monomers can be used in this aspect of the invention. For instance, the reaction composition of this invention can encompass one or more polycyclic olefin monomer of the formula (II):

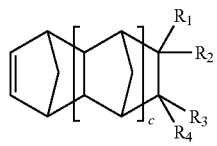
(II)

wherein:
c is an integer 0, 1 or 2;
$R_1$, $R_2$, $R_3$ and $R_4$ are the same or different and each independently of one another is selected from hydrogen, linear or branched $(C_1-C_{16})$alkyl, hydroxy$(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, perfluoro$(C_6-C_{10})$aryl, perfluoro$(C_6-C_{10})$aryl$(C_1-C_3)$alkyl, di$(C_1-C_2)$alkylmaleimide$(C_3-C_6)$alkyl, di$(C_1-C_2)$alkylmaleimide$(C_2-C_6)$alkoxy$(C_1-C_2)$alkyl, hydroxy, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_5-C_{10})$heteroaryloxy$(C_1-C_3)$alkyl, $(C_6-C_{10})$aryloxy, $(C_5-C_{10})$heteroaryloxy, $(C_1-C_6)$acyloxy, where each of the aforementioned substituents are optionally substituted with a group selected from halogen or hydroxy.

Representative examples of monomers of formula (II) include the following without any limitations:

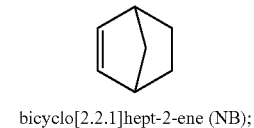
bicyclo[2.2.1]hept-2-ene (NB);

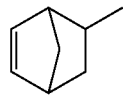
5-methylbicyclo[2.2.1]hept-2-ene (MeNB);

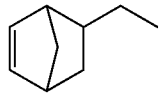
5-ethylbicyclo[2.2.1]hept-2-ene (EtNB);

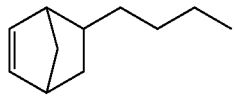
5-n-butylbicyclo[2.2.1]hept-2-ene (BuNB);

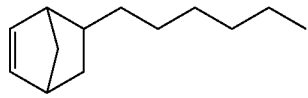
5-hexylbicyclo[2.2.1]hept-2-ene (HexNB);

-continued

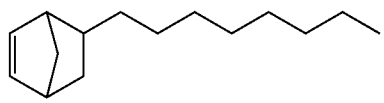
5-octylbicyclo[2.2.1]hept-2-ene (OctNB);

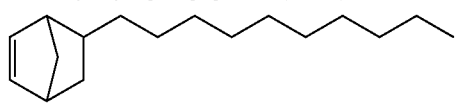
5-decylbicyclo[2.2.1]hept-2-ene (DecNB);

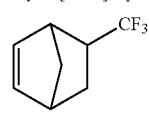
5-trifluoromethylbicyclo[2.2.1]hept-2-ene (CF$_3$NB);

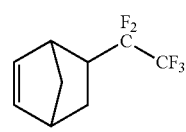
5-perfluoroethylbicyclo[2.2.1]hept-2-ene (C$_2$F$_3$NB);

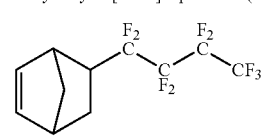
5-n-perfluorobutylbicyclo[2.2.1]hept-2-ene (C$_4$F$_9$NB);

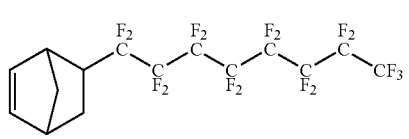
5-perfluorohexylbicyclo[2.2.1]hept-2-ene (C$_6$F$_{13}$NB);

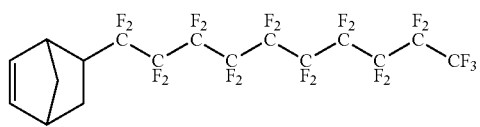
5-perfluorooctylbicyclo[2.2.1]hept-2-ene (OctNB);

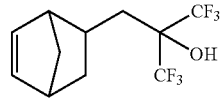
5-perfluorodecylbicyclo[2.2.1]hept-2-ene (DecNB);

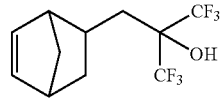
norbornenyl-2-trifluoromethyl-3,3,3-trifluoropropan-2-ol (HFANB);

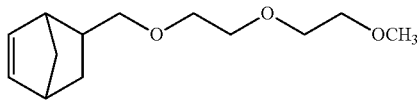
5-((2-(2-methoxyethoxy)ethoxy)methyl)bicyclo[2.2.1]hept-2-ene (NBTON);

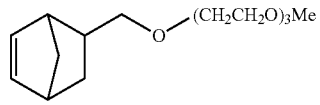
1-(bicyclo[2.2.1]hept-5-en-2-yl)-2,5,8,11-tetraoxadodecane (NBTODD);

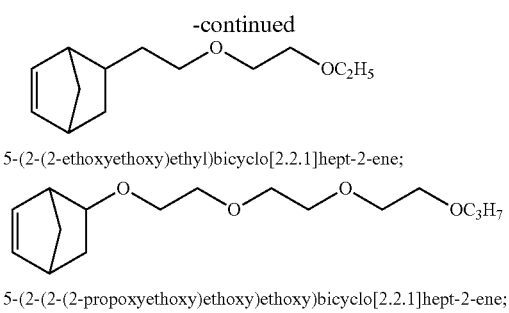

5-(2-(2-ethoxyethoxy)ethyl)bicyclo[2.2.1]hept-2-ene;

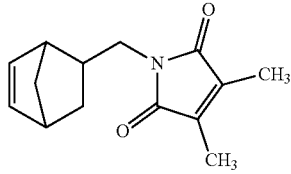

5-(2-(2-(2-propoxyethoxy)ethoxy)ethoxy)bicyclo[2.2.1]hept-2-ene;

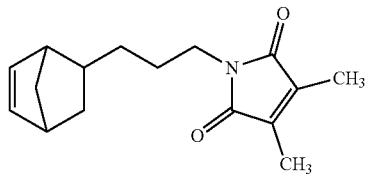

1-(bicyclo[2.2.1]hept-5-en-2-ylmethyl)-3,4-dimethyl-1H-pyrrole-2,5-dione (MeDMMINB);

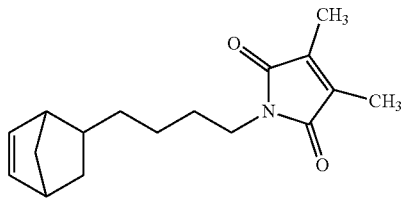

1-(3-bicyclo[2.2.1]hept-5-en-2-yl)propyl)-3,4-dimethyl-1H-pyrrole-2,5-dione (PrDMMINB);

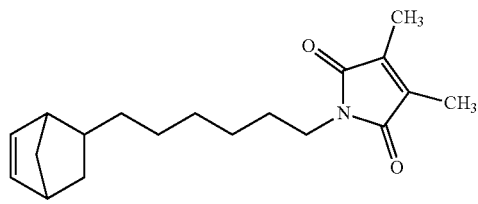

1-(4-(bicyclo[2.2.1]hept-5-en-2-yl)butyl)-3,4-dimethyl-1H-pyrrole-2,5-dione (BuDMMINB);

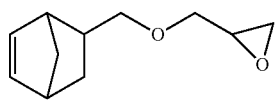

1-(6-(bicyclo[2.2.1]hept-5-en-2-yl)hexyl)-3,4-dimethyl-1H-pyrrole-2,5-dione (HexDMMINB);

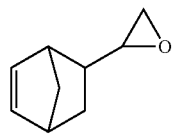

2-((bicyclo[2.2.1]hept-5-en-2-ylmethoxy)methyl)oxirane (MGENB);

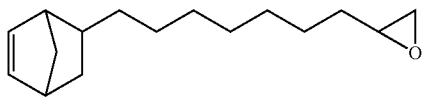

2-(bicyclo[2.2.1]hept-5-en-2-yl)oxirane;

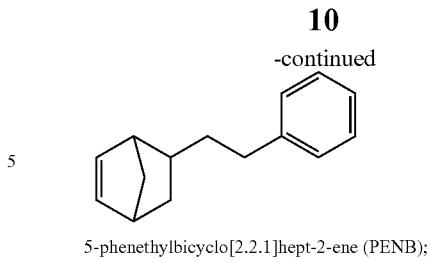

2-(7-(bicyclo[2.2.1]hept-5-en-2-yl)heptyl)oxirane;

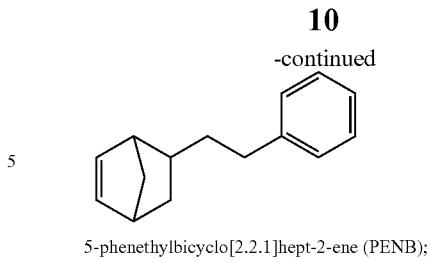

5-phenethylbicyclo[2.2.1]hept-2-ene (PENB);

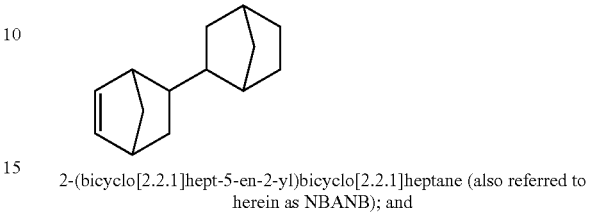

2-(bicyclo[2.2.1]hept-5-en-2-yl)bicyclo[2.2.1]heptane (also referred to herein as NBANB); and

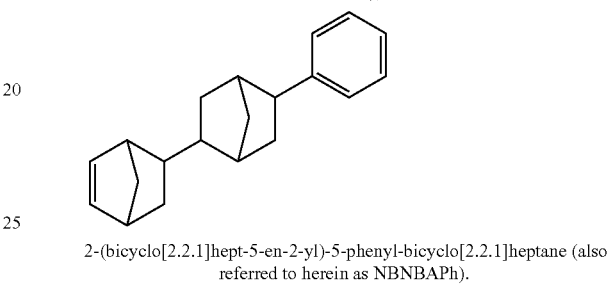

2-(bicyclo[2.2.1]hept-5-en-2-yl)-5-phenyl-bicyclo[2.2.1]heptane (also referred to herein as NBNBAPh).

Accordingly, in one of the embodiments the reaction composition of this invention encompasses one or more monomer of formula (II) selected from the group consisting of:
bicyclo[2.2.1]hept-2-ene (NB);
norbornenyl-2-trifluoromethyl-3,3,3-trifluoropropan-2-ol (HFANB);
5-hexylbicyclo-[2.2.1]hept-2-ene (HexNB);
5-octylbicyclo[2.2.1]hept-2-ene (OctNB);
5-decylbicyclo[2.2.1]hept-2-ene (DecNB);
5-perfluorobutylbicyclo[2.2.1]hept-2-ene ($C_4F_9$NB);
5-phenethylbicyclo[2.2.1]hept-2-ene (PENB); and
2-(bicyclo[2.2.1]hept-5-en-2-yl)bicyclo[2.2.1]heptane (NBANB).

In a further embodiment of this invention the composition of this invention encompasses one or more monomers of formula (II) are at least two distinct types of monomers of formula (II).

In yet another embodiment the composition of this invention encompasses at least one of the monomers of formula (II), which is 5-decylbicyclo[2.2.1]hept-2-ene (DecNB).

In yet another embodiment the composition of this invention encompasses at least one of the monomers of formula (II), which is 5-phenethylbicyclo[2.2.1]hept-2-ene (PENB).

In yet another embodiment the composition of this invention encompasses at least one of the monomers of formula (II), which is 5-hexylbicyclo-[2.2.1]hept-2-ene (HexNB).

In a further aspect of this invention any amount of compound of formula (I) can be employed in the reaction composition of this invention which brings about the intended effect. That is, any amount of compound of formula (I) can be employed such that one or more monomers of formula (II) can be polymerized under mass polymerization conditions employing a suitable transition metal compound. Accordingly, in one of the embodiments, the composition of this invention encompasses a compound of formula (I) in an amount of at least one (1) mole percent of the total loading of the monomers of formula (II). That is, a compound of formula (I) is present at least at a one (1) mole percent level compared to the total amount of one or more monomers of formula (II). In yet another embodiment the composition of this invention encompasses compound of formula (I) in an amount of from one (1) to ten (10) mole percent of the total loading of the monomers of formula (II). In yet another embodiment the composition of this invention encompasses compound of formula (I) in an amount of from five (5) to fifty (50) mole percent of the total loading of the monomers of formula (II). In further embodiments the compound of formula (I) can present at a level higher than 5 mol %; higher than 10 mol %; higher than 20 mol %; higher than 30 mol %; or higher than 40 mol %.

In another embodiment of this invention the reaction composition of this invention includes an organo-transition metal compound which facilitates the polymerization of the polycyclic olefin in the presence of a chain transfer agent under mass polymerization conditions. Generally, such organometallic compounds are capable of reacting with the chain transfer agent to form an intermediate "transition metal-hydride," which reacts further with the olefinic monomer thus initiating the polymerization. Various organo-transition metal compounds that brings about such a reaction can be used in this invention. In some embodiments of this invention such organo-transition metal compounds include compounds formed from nickel, palladium or platinum, among others. Other suitable transition metals include any of the Group X transition metal or Group IX metal, such as for example, cobalt, rhodium or iridium.

In another embodiment of this invention the organo-transition metal compound includes a Lewis Base, which is coordinately bonded to the metal atom, M. That is, the Lewis Base is bonded to the metal atom by sharing both of its lone pair of electrons. Any of the Lewis Base known in the art can be used for this purpose. Advantageously, it has now been found that a Lewis Base, which can dissociate readily under the polymerization conditions as described further in detail below generally provides more suitable compounds of formula (I) as polymerization catalysts. Thus, in one aspect of this invention judicious selection of the Lewis Base will provide a modulation of the catalytic activity of the compounds of this invention.

Accordingly, it has now been found that suitable LBs that can be employed include without any limitation substituted and unsubstituted nitriles, including alkyl nitrile, aryl nitrile or aralkyl nitrile; phosphine oxides, including substituted and unsubstituted trialkyl phosphine oxides, triaryl phosphine oxides, triaralkyl phosphine oxides, and various combinations of alkyl, aryl and aralkyl phosphine oxides; substituted and unsubstituted pyrazines; substituted and unsubstituted pyridines; phosphites, including substituted and unsubstituted trialkyl phosphites, triaryl phosphites, triaralkyl phosphites, and various combinations of alkyl, aryl and aralkyl phosphites; phosphines, including substituted and unsubstituted trialkyl phosphines, triaryl phosphines, triaralkyl phosphines, and various combinations of alkyl, aryl and aralkyl phosphines. Various other LBs that may be employed include various ethers, alcohols, ketones, amines and anilines, arsines, stibines, and the like.

In an embodiment of this invention, the LB is selected from acetonitrile, propionitrile, n-butyronitrile, tert-butyronitrile, benzonitrile ($C_6H_5CN$), 2,4,6-trimethylbenzonitrile, phenyl acetonitrile ($C_6H_5CH_2CN$), pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,6-di-t-butylpyridine, 2,4-di-t-butylpyridine, 2-methoxypyridine, 3-methoxypyridine, 4-methoxypyridine, pyrazine, 2,3,5,6-tetramethylpyrazine, diethyl ether, di-n-butyl ether, dibenzyl ether, tetrahydrofuran, tetrahydropyran, benzophenone, triphenylphosphine oxide, triphenyl phosphate and $PR_3$, where R is independently selected from methyl, ethyl, ($C_3$-$C_6$) alkyl, substituted or unsubstituted ($C_3$-$C_7$)cycloalkyl, ($C_6$-$C_{10}$)aryl, ($C_6$-$C_{10}$)aralkyl, methoxy, ethoxy, ($C_3$-$C_6$)alkoxy, substituted or unsubstituted ($C_3$-$C_7$)cycloalkoxy, ($C_6$-$C_{10}$) aryloxy and ($C_6$-$C_{10}$)aralkyloxy. Representative examples of $PR_3$ include without any limitation trimethyl phosphine, triethyl phosphine, tri-n-propyl phosphine, tri-iso-propyl phosphine, tri-n-butyl phosphine, tri-iso-butyl phosphine, tri-tert-butyl phosphine, tricyclopentylphosphine, triallylphosphine, tricyclohexylphosphine, triphenyl phosphine, trimethyl phosphite, triethyl phosphite, tri-n-propyl phosphite, tri-iso-propyl phosphite, tri-n-butyl phosphite, tri-iso-butyl phosphite, tri-tert-butyl phosphite, tricyclopentylphosphite, triallylphosphite, tricyclohexylphosphite, triphenyl phosphite, and the like. It should however be noted that various other known LBs which will bring about the intended activity can also be used in this embodiment of the invention.

Other examples of organophosphorus compounds suitable as LBs include phosphinite and phosphonate ligands. Representative examples of phosphinite ligands include but are not limited to methyl diphenylphosphinite, ethyl diphenylphosphinite, isopropyl diphenylphosphinite, and phenyl diphenylphosphinite. Representative examples of phosphonite ligands include but are not limited to diphenyl phenylphosphonite, dimethyl phenylphosphonite, diethyl methylphosphonite, diisopropyl phenylphosphonite, and diethyl phenylphosphonite.

In a further aspect of this invention, it has now been found that the organo-transition metal compound having a counter anion, $Z^\ominus$, which is a weakly coordinating anion (WCA) provides better catalytic activity. That is, the WCA is an anion which is only weakly coordinated to the cation complex. It is sufficiently labile to be displaced by a neutral Lewis base, solvent or monomer. More specifically, the WCA anion functions as a stabilizing anion to the cation complex and does not form a covalent bond with the metal atom, M. The WCA anion is relatively inert in that it is non-oxidative, non-reducing, and non-nucleophilic.

In general, the WCA can be selected from borates, phosphates, arsenates, antimonates, aluminates, boratobenzene anions, carborane, halocarborane anions, sulfonamidate and sulfonates.

Broadly speaking, suitable borate anion can be represented by Formula A, phosphate, arsenate and antimonate anions can be represented by Formula B, and aluminate anions can be represented by Formula C:

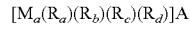

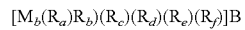

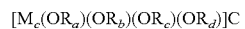

Wherein in Formula A, $M_a$ is boron, in Formula B $M_b$ is phosphorus, arsenic or antimony, in Formula C, $M_c$ is aluminum. $R_a$, $R_b$, $R_c$, $R_d$, $R_e$ and $R_f$ independently represent fluorine, linear and branched $C_1$-$C_{10}$ alkyl, linear and branched $C_1$-$C_{10}$ alkoxy, linear and branched $C_3$-$C_5$ haloalkenyl, linear and branched $C_3$-$C_{12}$ trialkylsiloxy, $C_{18}$-$C_{36}$ triarylsiloxy, substituted and unsubstituted $C_6$-$C_{30}$ aryl, and substituted and unsubstituted $C_6$-$C_{30}$ aryloxy groups wherein $R_a$ to $R_f$ cannot all simultaneously represent alkoxy or aryloxy groups. When substituted the aryl groups can be monosubstituted or multisubstituted, wherein the substituents are independently selected from linear and branched $C_1$-$C_5$ alkyl, linear and branched $C_1$-$C_5$ haloalkyl, linear and branched $C_1$-$C_5$ alkoxy, linear and branched $C_1$-$C_5$ haloalkoxy, linear and branched $C_1$-$C_{12}$ trialkylsilyl, $C_6$-$C_{18}$ triarylsilyl, and halogen selected from chlorine, bromine, and fluorine.

Representative borate anions of Formula A include but are not limited to tetrafluoroborate, tetraphenylborate, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-i-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)ethyl]-5-(trifluoromethyl)phenyl]borate.

Representative phosphates, arsenates, antimonates of Formula B include but are not limited to hexafluorophosphate, hexaphenylphosphate, hexakis(pentafluorophenyl)phosphate, hexakis(3,5-bis(trifluoromethyl)phenyl)phosphate, hexafluoroarsenate, hexaphenylarsenate, hexakis(pentafluorophenyl)arsenate, hexakis(3,5-bis(trifluoromethyl)phenyparsenate, hexafluoroantimonate, hexaphenylantimonate, hexakis(pentafluorophenyl)antimonate, hexakis(3,5-bis(trifluoromethyl)phenyl)antimonate, and the like.

Representative aluminate anions of Formula C include but are not limited to tetrakis(pentafluorophenyl)aluminate, tris(nonafluorobiphenyl)fluoroaluminate, (octyloxy)tris(pentafluorophenyl)aluminate, tetrakis(3,5-bis(trifluoromethyl)phenyl)aluminate, and methyltris(pentafluorophenyl)aluminate.

In an embodiment of this invention suitable $Z^\ominus$ is selected from $B(C_6F_5)_4^\ominus$, $B[C_6H_3(CF_3)_2]_4^\ominus$, $B(C_6H_5)_4^\ominus$, $[Al(OC(CF_3)_2C_6F_5)_4]^\ominus$, $BF_4^\ominus$, $PF_6^\ominus$, $AsF_6^\ominus$, $SbF_6^\ominus$, $(CF_3SO_2)N^\ominus$ and $CF_3SO_3^\ominus$.

In one of the embodiments of this invention, the reaction composition of this invention encompasses an organo-transition metal compound of the formula (III):

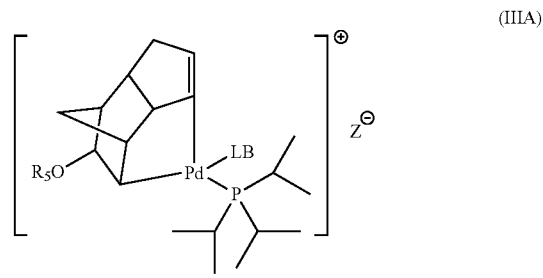

(III)

wherein,
LB is selected from pyridine, acetonitrile or $C_6H_5CN$;
$Z^\ominus$ is selected from $B(C_6F_5)_4^\ominus$, $B(C_6H_5)_4^\ominus$, $BF_4^\ominus$ or $CF_3SO_3^\ominus$;
$R_6$ is independently selected from methyl, ethyl, ($C_3$-$C_6$) alkyl, substituted or unsubstituted ($C_3$-$C_7$)cycloalkyl, ($C_6$-$C_{10}$)aryl, ($C_6$-$C_{10}$)aralkyl, methoxy, ethoxy, ($C_3$-$C_6$)alkoxy, substituted or unsubstituted ($C_3$-$C_7$)cycloalkoxy, ($C_6$-$C_{10}$) aryloxy and ($C_6$-$C_{10}$)aralkyloxy; and $R_5$ is methyl, ethyl, linear or branched ($C_3$-$C_6$)alkyl, ($C_6$-$C_{10}$)aralkyl or $R_7CO$, where $R_7$ is methyl, ethyl or ($C_3$-$C_6$)alkyl.

In a further embodiment of this invention the compound of formula (III) is having the following substituents:
LB is acetonitrile;
$Z^\ominus$ is $B(C_6F_5)_4^\ominus$;
$R_6$ is n-propyl, isopropyl, tert-butyl or phenyl; and
$R_5$ is n-propyl, isopropyl, tert-butyl or —OCOCH$_3$.

In another embodiment the reaction composition of this invention encompasses an organo-transition metal compound represented by formula (IIIA):

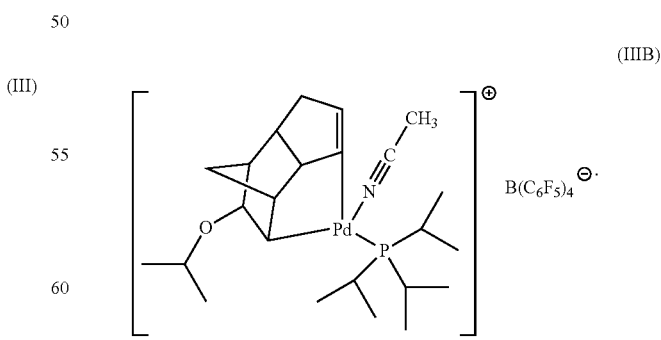

(IIIA)

wherein:
LB is acetonitrile or pyridine;
$Z^\ominus$ is selected from $B(C_6F_5)_4^\ominus$ or $BF_4^\ominus$; and
$R_5$ is isopropyl or —OCOCH$_3$.

In this aspect of the embodiment, the compound of formula (IIIA) is having the substituents as follows:
LB is either acetonitrile or pyridine; $Z^\ominus$ is $B(C_6F_5)_4^\ominus$ or $BF_4^\ominus$.

In yet another embodiment the reaction composition of this invention encompasses an organo-transition metal compound represented by formula (IIIB):

(IIIB)

In yet another embodiment the reaction composition of this invention encompasses an organo-transition metal compound represented by formula (IIIC):

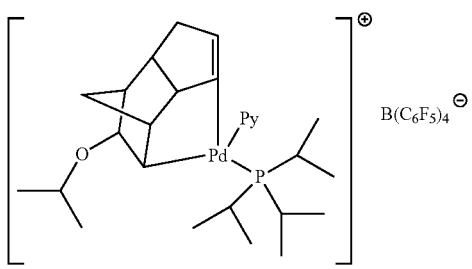

(IIIC)

wherein Py is pyridine.

In yet another embodiment the reaction composition of this invention encompasses an organo-transition metal compound represented by formula (IIID):

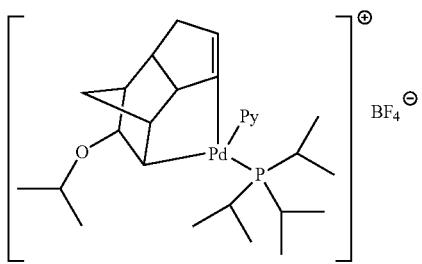

(IIID)

wherein Py is pyridine.

In another embodiment the reaction composition of this invention encompasses an organo-transition metal compound represented by formula (IV):

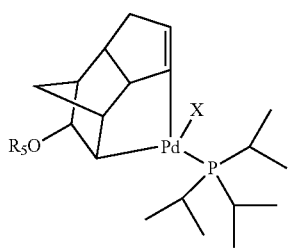

(IV)

wherein:

X is chlorine or triflate; and $R_5$ is n-propyl, isopropyl or —OCOCH$_3$.

In further embodiments of this invention the compound of formula (IV) encompasses where $R_5$ is isopropyl or n-propyl; or where $R_5$ is —OCOCH$_3$.

Non-limiting exemplary compounds of formula (IV), can be represented by formulae (IVA), (IVB) or (IVC):

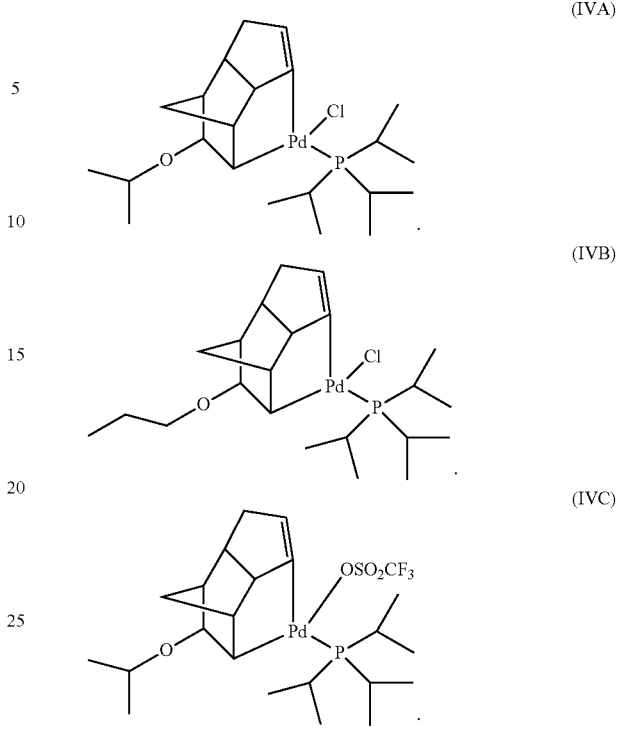

(IVA)

(IVB)

(IVC)

In another embodiment of this invention, non-limiting examples of one or more organo-transition metal compounds that can be employed in the reaction composition can be selected from the group consisting of:

trans-[Pd(NCMe)(OAc)(P(i-propyl)$_3$)$_2$]B(C$_6$F$_5$)$_4$,
trans-[Pd(NCC(CH$_3$)$_3$)(OAc)(P(i-propyl)$_3$)$_2$]B(C$_6$F$_5$)$_4$,
trans-[Pd(OC(C$_6$H$_5$)$_2$)(OAc)(P(i-propyl)$_3$)$_2$]B(C$_6$F$_5$)$_4$,
trans-[Pd(HOCH(CH$_3$)$_2$)(OAc)(P(i-propyl)$_3$)$_2$]B(C$_6$F$_5$)$_4$,
trans-[Pd(NCMe)(OAc)(P(cyclohexyl)$_3$)$_2$]B(C$_6$F$_5$)$_4$,
Pd(OAc)$_2$(P(cyclohexyl)$_3$)$_2$,
Pd(OAc)$_2$(P(i-propyl)$_3$)$_2$,
Pd(OAc)$_2$(P(i-propyl)$_2$(phenyl))$_2$,
trans-[Pd(NCMe)(OAc)(P(cyclohexyl)$_2$(t-butyl))$_2$]B(C$_6$F$_5$)$_4$, where OAc is OCOCH$_3$.

In yet another embodiment of this invention, further non-limiting examples of one or more organo-transition metal compounds that can be employed in the reaction composition can be selected from the group consisting of:

nickel(2,4,6-trifluoromethylphenyl)$_2$;
nickel($\eta^6$-toluene)(pentafluorophenyl)$_2$;
nickel (tetrahydrofuran)$_2$(pentafluorophenyl)$_2$;
[(allyl)Ni(1,4-cyclooctadiene)]PF$_6$,
[(crotyl)Ni(1,4-cyclooctadiene)]PF$_6$; and
[(allyl)Ni(1,4-cyclooctadiene)]SbF$_6$.

In another aspect of this invention, the reaction composition of this invention encompassing the organo-transition metal compound, such as for example, a compound of formula (III) or a compound of formula (IV) can be further admixed in-situ with certain of the compounds of formula (V), as discussed below, to form very active bicomponent initiator systems. It has now surprisingly been found that such catalyst systems are very useful for preparing a variety of polymers from certain of the cyclo olefinic monomers as described herein under mass polymerization conditions and avoid extraneous ligands, such as acetonitrile.

Accordingly, the reaction composition of this invention further encompasses a compound of the formula (V):

$M_d^{\oplus} Z^{\ominus}$ (V);

wherein $M_d^{\oplus}$ is a cation selected from lithium, sodium, potassium, cesium, barium, ammonium and linear or branched tetra($C_1$-$C_4$)alkyl ammonium;

$Z^{\ominus}$ is a weakly coordinating anion selected from selected from $B(C_6F_5)_4^{\ominus}$, $B[C_6H_3(CF_3)_2]_4^{\ominus}$, $B(C_6H_5)_4^{\ominus}$, $[Al(OC(CF_3)_2C_6F_5)_4]^{\ominus}$, $BF_4^{\ominus}$, $PF_6^{\ominus}$, $AsF_6^{\ominus}$, $SbF_6^{\ominus}$, $(CF_3SO_2)N^{\ominus}$ and $CF_3SO_3^{\ominus}$ Further, the compound of formula (V) is selected from the group consisting of:
lithium tetrafluoroborate;
lithium triflate;
lithium tetrakis(pentafluorophenyl)borate;
lithium (diethyl ether) tetrakis(pentafluorophenyl)borate ($[Li(OEt_2)_{2.5}][B(C_6F_5)_4]$) (LiFABA);
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate; and
lithium methyltris(pentafluorophenyl)aluminate.

As noted, the polymerization reactions can be carried out neat, i.e., under mass polymerization conditions. That is, by practice of the instant invention it is now possible to make a variety of polymers containing at least one functionalized norbornene monomer (i.e., a compound of formula (II)) in the presence of a chain transfer agent, i.e. a compound of formula (I). The polymerizations are generally carried out in the presence of an organo-transition metal compound, such as for example, an unicomponent initiator (i.e., a compound of formula (III)) or a bicomponent initiator (i.e., a compound of formula (IV) as initiator) in combination with a compound of formula (V) as activator) as described herein. However, it should be noted that even when an unicomponent initiator, such as, compound of formula (III) or other similar palladium compound as described herein is employed, it has now been found that it may be advantageous to use a compound of formula (V) as an activator compound in combination with any of the unicomponent initiator compound as described herein.

It has also been found that the organo-transition metal compounds as described herein either as unicomponent or bicomponent compositions as described herein are highly active. Thus it is now possible to make polymers of high quality by employing small amounts of these compounds as polymerization initiators. Accordingly, in one of the embodiments the addition polymerization can effectively be carried out using monomer to unicomponent initiator molar ratio of at least 100:1 based on the total moles of monomers and the initiator employed. That is, 100 moles of monomer to one mole of the unicomponent initiator is employed. In other embodiments the molar ratio of monomer:catalyst can be 1,000,000:1; 500,000:1; 100,000:1; 20,000:1; 10,000:1, 5,000:1, 500:1, 400:1, 200:1, and the like. When bicomponent initiator systems are employed the molar ratio of monomer:initiator:activator can be at least 100:1:1. In other embodiments the molar ratio of monomer:initiator:activator can be 1,000,000:1:1; 500,000:1:1; 100,000:1:1; 20,000:1:1; 10,000:1:1, 1,000:1:1, 500:1:1, 400:1:1, 200:1:1, and the like. In some embodiments the activator is used in excess of the mole quantities of the initiator used, such as for example, molar ratios of initiator:activator can be from 1:1 to 1:6.

As noted, the mass polymerization reaction can be carried out with catalyst and monomer without any solvent. Advantageously, such polymerization reactions can also be carried out in a mold at a suitable temperature to form three dimensional polymeric products. In general, the reaction temperatures can range from sub-ambient temperature, such as for example below 0° C. to boiling point of the monomers, however, it is recommended that the components of the reaction vessel or the mold is not heated beyond the flash points of one or more of the monomers. Generally, the mass polymerization is carried out at a temperature range from about 10° C. to 300° C., in some other embodiments the temperature range can be from about 10° C. to 200° C.; or from about 20° C. to 100° C.

Since the polymerization reaction is exothermic, the temperature in the mold during the course of the polymerization is usually higher than the temperature of the feed, unless a chilled mold is employed. Accordingly, the initial mold temperature can generally be within the range of about −20° C. to about 300° C.; or from about 0° C. to about 200° C.; or from 20° C. and 100° C. Temperature distribution in the mold is affected by such factors as mold geometry, characteristics of the mold as a heat sink or heat supplying means, reactivity of catalyst and monomer, and the like. To some extent, the selection of suitable temperatures and heat exchange conditions will have to be based on experience with a given system of mold, feed and catalyst.

After the polymerization reaction is complete, the molded object may be subjected to an additional post cure treatment at a temperature in the range of about 100° C. to 300° C. for about 15 minutes to 24 hours; or 1 to 2 hours. Such a post cure treatment can enhance polymeric properties including glass transition temperature ($T_g$) and heat distortion temperature (HDT). In addition, postcuring is desirable but not essential, to bring the samples to their final stable dimensional states, to minimize residual odors, and to improve final physical properties.

Advantageously, it has now been found that the mass polymerization of the reaction compositions of this invention can conveniently be carried out by heating the composition in stages: first heating the reaction composition to a temperature of from about 80° C. to 110° C. and maintaining at that temperature for some time, for example from about 5 minutes to 1 hour; and then heating the composition to a second temperature of from about 110° C. to 140° C. and maintaining at that temperature for some time, for example from about 5 minutes to 1 hour.

In some other embodiments it has also been found that carrying out the mass polymerization in more than two gradient temperature offers better polymerized product. Accordingly, in one of the embodiments the polymerization is carried out by heating the reaction composition of this invention in four incremental temperature ranges as follows:

first heating the reaction composition to a temperature of from about 40° C. to 60° C. and maintaining at that temperature for about 5 minutes to 1 hour; then heating the composition to a second temperature of from about 60° C. to 80° C. and maintaining at that temperature for about 5 minutes to 1 hour; then heating the composition to a third temperature of from about 80° C. to 100° C. and maintaining at that temperature for about 5 minutes to 1 hour; and finally heating the composition to a fourth temperature of from about 100° C. to 120° C. and maintaining at that temperature for about 5 minutes to 1 hour. However, it should be noted that any of the other temperature and time conditions can also be employed to form polymers from the reaction compositions of this invention and of such conditions are within the scope of this invention.

The polymers formed according to this invention generally exhibit a weight average molecular weight ($M_w$) of at least about 3,000. In another embodiment, the polymer of this invention has a $M_w$ of at least about 5,000. In another embodiment, the polymer of this invention has a $M_w$ of at least about 10,000. In another embodiment, the polymer of this invention has a $M_w$ of at least about 20,000. In yet another embodiment, the polymer of this invention has a $M_w$ of at least about 50,000. In some other embodiments, the polymer of this invention has a $M_w$ of at least about 100,000. In another embodiment, the polymer of this invention has a $M_w$ of higher than 100,000 and can be higher than 500,000 in some other embodiments. The weight average molecular weight ($M_w$) of the polymers can be determined by any of the known techniques, such as for example, by gel permeation chromatography (GPC) equipped with suitable detector and calibration standards, such as differential refractive index detector calibrated with narrow-distribution polystyrene standards. The polydispersity index (PDI), which is a ratio of weight average molecular weight ($M_w$) to number average molecular weight ($M_n$) can also be measured from this method.

In another aspect of this invention there is also provided a method of mass polymerizing polycyclic olefin monomers comprising:
combining a compound of formula (I):

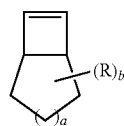

(I)

wherein
a is an integer from 0 to 4;
b is an integer from 0 to 2a+4;
each R is hydrogen, halogen, methyl, ethyl, ($C_3$-$C_6$)alkyl, substituted or unsubstituted ($C_3$-$C_7$)cycloalkyl, ($C_6$-$C_{10}$)aryl, ($C_6$-$C_{10}$)aralkyl, methoxy, ethoxy, ($C_3$-$C_6$)alkoxy, substituted or unsubstituted ($C_3$-$C_7$)cycloalkoxy, ($C_6$-$C_{10}$)aryloxy and ($C_6$-$C_{10}$)aralkyloxy;
with one or more polycyclic olefin monomers; and an organo-transition metal compound to form a mixture; and
polymerizing the mixture to form a polymer.

As noted, one or more compounds of formula (I) as described herein can be combined with one or more of a polycyclic olefin monomers, such as the ones described herein having the formula (II) in the presence of one or more of an organo-transition compounds as described herein to form the polymers under mass polymerization conditions as described herein. Any of the known reaction conditions can be employed to form such polymers, including the temperature and "in mold" conditions described hereinabove.

In an embodiment of this invention the method of this invention includes a compound of formula (I), which activates said organo-transition metal compound by forming a metal-hydride containing moiety. In this aspect of the invention the organo-transition metal compound is a palladium compound.

In a further embodiment of this invention the method of this invention further comprises adding one or more compounds of the formula (V). Any of the compounds of formula (V) as described hereinabove can be employed in this aspect of the method of this invention.

In addition, any of the organo-transition compounds as described herein including the compounds of formulae (III), (IIIA), (IIIB), (IIIC), (IIID), as well as any of the compounds of formulae (IV), (IVA), (IVB) and (IVC) can be used in the method of this invention.

Advantageously, it has now been found that various other palladium compounds can also be employed in the method of this invention. Such palladium compounds suitable for forming polymers using the reaction composition of this invention are represented by the formula:

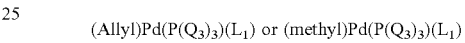

wherein Q may be the same or different and is independently selected from isopropyl, tert-butyl, neopentyl and cyclohexyl; and $L_1$ is selected from halogen, trifluoroacetate, and trifluoromethanesulfonate (triflate). Non-limiting examples of such palladium compounds include the following:
allylpalladium(triisopropylphosphine) chloride, [Pd(allyl)(triisopropylphosphine)Cl];
allylpalladium(tri-tert-butylphosphine) chloride, [Pd(allyl)(tri-tert-butylphosphine)Cl];
allylpalladium(diisopropyl-tert-butylphosphine) chloride, [Pd(allyl)(diisopropyl-tert-butylphosphine)Cl];
(allyl)palladium(tricyclohexylphosphine)triflate, [Pd(allyl)(tricyclohexylphosphine)triflate];
(allyl)palladium(triisopropylphosphine)triflate, [Pd(allyl)(triisopropylphosphine)triflate];
(allyl)palladium(tricyclohexyl phosphine)trifluoroacetate, [Pd(allyl)(tricyclohexylphosphine)trifluoroacetate];
(allyl)palladium(triisopropylphosphine)trifluoroacetate, [Pd(allyl)(triisopropylphosphine)trifluoroacetate];
methylpalladium(triisopropylphosphine) chloride, [Pd(methyl)(triisopropylphosphine)Cl];
methylpalladium(tri-tert-butylphosphine) chloride, [Pd(methyl)(tri-tert-butylphosphine)Cl];
methylpalladium(diisopropyl-tert-butylphosphine) chloride, [Pd(methyl)(diisopropyl-tert-butylphosphine)Cl];
methylpalladium(tricyclohexylphosphine) chloride, [Pd(methyl)(tricyclohexylphosphine)Cl], also abbreviated as [(Me-Pd-PCy$_3$)Cl], where Cy is cyclohexyl ($C_6H_{11}$);
methylpalladium(dicyclohexyl-tert-butylphosphine) chloride, [Pd(methyl)(dicyclohexyl-tert-butylphosphine)Cl];
methylpalladium(cyclohexyl-di(tert-butyl)phosphine) chloride, [Pd(methyl)(cyclohexyl-di(tert-butyl)phosphine)Cl]; and the like.

As also noted above, the palladium compounds as mentioned above are generally used in conjunction with an additional compound which functions as a cocatalyst, initiator, pro-initiator or activator. For example, any of the compounds of formula (V) as described hereinabove can be used for this purpose. In one of the embodiments, non-limiting examples of such activator compounds include lithium tetrakis(pentafluorophenyl)borate etherate (Li- FABA-[Li(OEt$_2$)$_{2.5}$][B(C$_6$F$_5$)$_4$]) and N,N-dimethylaniliniumtetrakis(pentafluorophenyl)-borate (DANFABA), and the like.

Thus it should be noted that the palladium containing catalysts useful for making the polymers from the reaction composition of this invention can be prepared as a preformed single component catalyst or prepared in situ by admixing a palladium containing procatalyst with an activator (or a cocatalyst, initiator or pro-initiator, as mentioned above) in the presence of the desired monomer(s) to be polymerized.

Accordingly, the preformed initiator can be prepared by admixing the initiator precursors such as a procatalyst and activator (or a cocatalyst, initiator or pro-initiator) in an appropriate solvent, allowing the reaction to proceed under appropriate temperature conditions, and isolating the reaction product, that is, a preformed initiator product. By procatalyst is meant a palladium containing compound that is converted to an active initiator by a reaction with a cocatalyst, activator or pro-initiator compound. Further description and synthesis of representative procatalysts and activator compounds can be found in U.S. Pat. No. 6,455,650, pertinent portions of which are incorporated herein by reference.

In one of the embodiments, various polymers can be formed by practicing the method of this invention. Non-limiting examples of such polymers formed from the method of this invention may be enumerated as follows:

a polymer derived from 5-hexylbicyclo[2.2.1]hept-2-ene (HexNB);

a polymer derived from 5-decylbicyclo[2.2.1]hept-2-ene (DecNB); and a polymer derived from 5-phenethylbicyclo[2.2.1]hept-2-ene (PENB).

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

This invention is further illustrated by the following examples which are provided for illustration purposes and in no way limit the scope of the present invention.

EXAMPLES

The following abbreviations have been used hereinbefore and hereafter in describing some of the compounds, instruments and/or methods employed to illustrate certain of the embodiments of this invention:
DecNB: 5-decylbicyclo[2.2.1]hept-2-ene; HexNB: 5-hexylbicyclo-[2.2.1]hept-2-ene; PENB: 5-phenethylbicyclo[2.2.1]hept-2-ene; BCO—bicyclo[4.2.0]oct-7-ene; DANFABA—N,N-dimethylaniliniumtetrakis(pentafluorophenyl)-borate; LiFABA—lithium tetrakis(pentafluoro-phenyl)borate; TBS—tri-n-butylsilane; THF—tetrahydrofuran; CTA—chain transfer agent; GPC: gel permeation chromatography; M$_w$—weight average molecular weight; PD—polydispersity; $^1$H NMR—proton nuclear magnetic resonance spectroscopy.

The following examples describe the procedures used for the preparation of various polymers as disclosed herein.

However, it should be noted that these examples are intended to illustrate the disclosure without limiting the scope thereof.

The following Examples 1 to 11 illustrate the mass polymerization of DecNB using two different palladium compounds.

Examples 1-5

The following Examples 1-5 demonstrate the effects of various levels of BCO on homopolymer molecular weight.

Into a suitable reactor purged with nitrogen were placed 5000 parts of DecNB, one part of palladium compound (AcO—Pd—NCCH$_3$(P-i-Pr$_3$)$_2$B(C$_6$F$_5$)$_4$) and 2 parts of DANFABA. To this mixture was then added desirable amounts of BCO ranging from 1 mole percent to 7.5 mole percent based on the amount of monomer employed, as summarized in Table 1. The reaction mixture was then heated to 85° C. and maintained at this temperature for 30 minutes and then heated to 110° C. and maintained at that temperature for 30 minutes. After which time the reaction mixture was allowed to cool to room temperature. The resulting products in each of the Examples 1 to 5 were characterized by GPC in THF, the M$_w$ and PD for each of the Examples 1 to 5 are summarized in Table 1. The thermal stability of each of the polymer products from Examples 1 to 5 were also analyzed by TGA, the temperature at which 5 weight percent loss of the polymer products are also summarized in Table 1. In addition, the percent weight loss of the monomer during polymerization was also measured and is summarized in Table 1 for each of the Examples 1 to 5.

TABLE 1

| Example No. | Mol % BCO | % Weight Loss | GPC M$_w$/PD | TGA, °C. (5% weight loss) |
| --- | --- | --- | --- | --- |
| 1 | 1 | 4 | 125,000/4.5 | 354 |
| 2 | 2 | 5.3 | 76,000/4.5 | 359 |
| 3 | 3.3 | 5.2 | 54,000/4.4 | 352 |
| 4 | 5 | 5.8 | 28,000/3.3 | 356 |
| 5 | 7.5 | 5.6 | 25,000/3.3 | 344 |
| Comp. Ex. 1 | 0 | 5 | Insoluble | 357 |

Also summarized in Table 1 is the data obtained from Comparative Example 1 which contained no BCO. It is quite evident from this data that BCO has surprising effect on controlling the molecular weight of poly(DecNB), and one can control the molecular weight of the resulting polymer simply by the amount of BCO employed.

The polymer obtained from Example 5 (5 mol % BCO) was also characterized by 1H NMR, which confirmed that the BCO is inserted into the end of the polymer chain having structure as shown below.

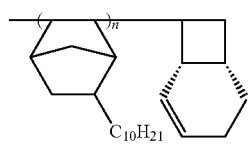

Examples 6-11

The procedures of Examples 1 to 5 were substantially repeated in these Examples 6 to 11 except that (iso-propoxydicyclopentadienyl)chloropalladium(triisopropyl)phosphine [Pd(i-PrO-DCPD)Cl(P-i-Pr$_3$)] was used as the palladium initiator in combination with LiFABA in the ratio of 5000 parts of DecNB as the monomer, 1 part of palladium compound and 1 part of LiFABA. In addition, the mole percent of BCO employed were varied as summarized in Table 2. Also summarized Table 2 are the percent weight loss of the monomer, the M$_w$ and PD as determined by GPC of each of the polymer products obtained and the 5% weight loss of the polymer product as determined by the TGA.

TABLE 2

| Example No. | Mol % BCO | % Weight Loss | GPC M$_w$/PD | TGA, °C. (5% weight loss) |
|---|---|---|---|---|
| 6 | 1 | 4.5 | 54,000/3.5 | 369 |
| 7 | 3.3 | 4.8 | 36,000/3.5 | 368 |
| 8 | 4 | 5 | 29,000/3.4 | 365 |
| 9 | 5 | 5.1 | 22,000/3 | 354 |
| 10 | 7.5 | 6.9 | 15,000/2.7 | 346 |
| 11 | 10 | 6.6 | 13,000/2.8 | 345 |
| Comp. Ex. 2 | 0 | 7 | Insoluble | 363 |

It is again evident that BCO acts as an effective chain transfer agent in Examples 6-11. Furthermore, these Examples illustrate that depending upon the type of metal initiator employed it is now possible to obtain a polycyclooolefin polymer having desirable properties based on the amount of BCO used as evidenced by the above examples.

Examples 12-14

Mass Polymerization of HexNB

Into a suitable reactor purged with nitrogen were placed 10,000 parts of HexNB, 1 part of palladium compound, trans-[Pd(NCMe)(OAc)(P(i-propyl)$_3$)$_2$]B(C$_6$F$_5$)$_4$, also referred to herein as (AcO—Pd—NCCH$_3$(P-i-Pr$_3$)$_2$B(C$_6$F$_5$)$_4$), and 2 parts of DANFABA. To this mixture was then added desirable amounts of BCO as follows: 5 mole percent in Example 12, 7.5 mole percent in Example 13 and 10 mole percent in Example 14. Each of the reaction mixture was heated in stages at four different temperatures: first heated to 50° C. and maintained at this temperature for 30 minutes, heated to 65° C. and maintained at that temperature for 30 minutes, then heated to 85° C. and maintained at that temperature for 30 minutes and finally heated to 110° C. and maintained at that temperature for 30 minutes. After which time the reaction mixture was allowed to cool to room temperature. The resulting products in each of the Examples 12 to 14 were characterized by GPC in THF, the M$_w$ and PD for each of the Examples 12 to 14 are as follows: Example 12—M$_w$/PD 53,700/4.2; Example 13—M$_w$/PD 30,800/4.8; and Example 14—M$_w$/PD 22,000/4.4.

Examples 15-17

Mass Polymerization of PENB

Into a suitable reactor purged with nitrogen were placed 10,000 parts of PENB, 1 part of palladium compound (AcO—Pd—NCCH$_3$(P-i-Pr$_3$)$_2$B(C$_6$F$_5$)$_4$) and 2 parts of DANFABA. To this mixture was then added desirable amounts of BCO as follows: 5 mole percent in Example 15, 7.5 mole percent in Example 16 and 10 mole percent in Example 17. Each of the reaction mixture was heated in stages at four different temperatures: first heated to 50° C. and maintained at this temperature for 30 minutes, heated to 65° C. and maintained at that temperature for 30 minutes, then heated to 85° C. and maintained at that temperature for 30 minutes and finally heated to 110° C. and maintained at that temperature for 30 minutes. After which time the reaction mixture was allowed to cool to room temperature. The resulting products in each of the Examples 15 to 17 were characterized by GPC in THF, the M$_w$ and PD for each of the Examples 15 to 17 are as follows: Example 15—M$_w$/PD 34,900/5.7; Example 16—M$_w$/PD 20,800/4.6; and Example 17—M$_w$/PD 16,800/4.7.

Example 18

Thermogravimetric Analysis

The polymer products from Examples 1 to 5 were also tested for their thermal stability by thermogravimetric analysis (TGA). FIG. 1 shows the thermograms obtained for each of the samples respectively from Examples 1 to 5. It is evident from this data that onset of thermal decomposition depends upon the amount of BCO used to form the polymer. The insoluble polymer formed without any BCO exhibited an onset of decomposition temperature (T$_d$) of 374° C. Addition of BCO as chain transfer agent gradually decreased the Td from 364° C. with 5 mole % BCO to 324° C. with 50 mole % BCO.

Figure 2:
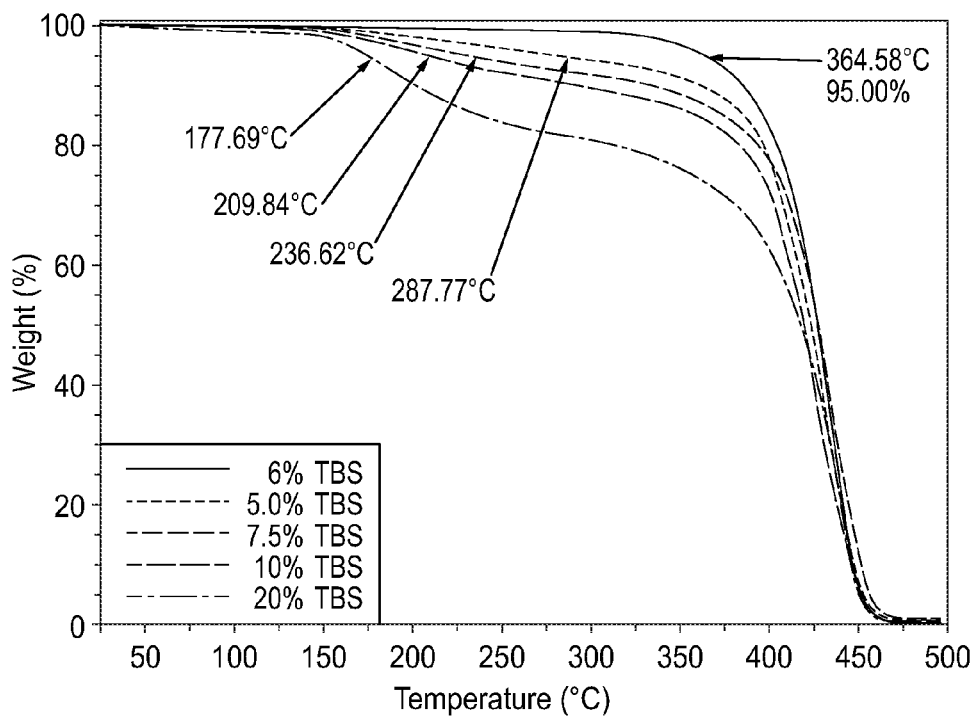
FIG. 2 shows a thermogram from thermogravimetric analysis (TGA) of a comparative composition.

For comparative purposes, similar TGA analyses were also conducted for polymer products obtained from Comparative Example 3 where various amounts of tri-n-butyl silane (TBS) was used as the chain transfer agent. The results are shown in FIG. 2. It is evident from FIG. 2 that use of TBS as a chain transfer agent results in markedly less thermally stable polymers in that the best onset of decomposition temperature (T$_d$) was observed to be 288° C. with 5 mol % TBS, and the Td significantly decreases to 178° C. with 20 mol % TBS. Whereas the polymers obtained in accordance with this invention exhibit T$_d$ ranging from 324° C. to 364° C. as shown in FIG. 1 and as discussed above. This clearly demonstrates the superior properties that can be obtained from the practice of this invention.

Comparative Example 1

The procedures of Examples 1 to 5 were substantially repeated in this Comparative Example 1 except that no BCO was used in this Comparative Example 1. The polymer product obtained in this Comparative Example 1 was insoluble in THF.

Comparative Example 2

The procedures of Examples 6 to 11 were substantially repeated in this Comparative Example 2 except that no BCO was used in this Comparative Example 2. The polymer product obtained in this Comparative Example 2 was insoluble in THF.

Comparative Examples 3-7

Mass Polymerization Using TBS as a CTA

The procedures of Examples 1 to 5 were substantially repeated in this Comparative Example 3 except that various amounts of TBS was used as a chain transfer agent instead of BCO, and 1-decanol was used as an activating agent, the amounts of TBS and 1-decanol used in each of these Comparative Examples 3 to 7 are summarized in Table 3 as mole % of the DecNB monomer used to make the polymer.

TABLE 3

| Comparative Example No. | Mol % TBS/1-decanol | % Weight Loss | GPC $M_w$/PD | TGA, °C. (5% weight loss) |
|---|---|---|---|---|
| 3 | 0/0 | 7.8 | Insoluble | 365 |
| 4 | 5/5 | 10.3 | 42,900/4.3 | 288 |
| 5 | 7.5/7.5 | 12.1 | 27,200/3.4 | 237 |
| 6 | 10/10 | 13.4 | 20,300/3 | 210 |
| 7 | 20/20 | 17.9 | 8,100/2.2 | 178 |

Also summarized in Table 3 are the percent weight loss of the monomer during polymerization, the $M_w$ and PD as measured by GPC using THF as the solvent and the $T_d$ (5% weight loss) as determined by TGA. It is evident from the data presented in Table 3, a combination of TBS and 1-decanol results in significantly increased monomer loss during polymerization as evidenced by very high amount of monomer loss shown as % weight loss of the monomer, an indication of poor conversion. The $M_w$ of the resulting polymer was also significantly lower than that of the polymers obtained in accordance with this invention. More importantly the thermal stability of the polymers obtained in these Comparative Examples 3 to 7 are much inferior to the polymers obtained in accordance with this invention. This is further discussed and illustrated in Example 18 and shown in FIGS. 1 and 2.

Comparative Example 8

Cis-Cyclooctene as CTA

The procedures of Examples 1 to 5 were substantially repeated in this Comparative Example 8 except that 20 mole % of cis-cyclooctene was used as a chain transfer agent in this Comparative Example 8. The polymer product obtained in this Comparative Example 8 appears to form clear solution in THF, which was filtered through 5 μm filter. However, attempts to determine the molecular weight of the polymer was not successful probably due to the formation of microgels.

Comparative Examples 9 and 10

1-Hexene as CTA

The procedures of Examples 12 to 14 were substantially repeated in these Comparative Examples 9 and 10 except for slight modification in heating temperatures as described herein and for using 1-hexene as a chain transfer agent (respectively 20 mol % and 5 mole % in Comparative Examples 9 and 10). Each of the reaction mixture was heated in stages at three different temperatures: first heated to 65° C. and maintained at that temperature for 60 minutes, then heated to 85° C. and maintained at that temperature for 30 minutes and finally heated to 130° C. and maintained at that temperature for 30 minutes. After which time the reaction mixture was allowed to cool to room temperature. The resulting products in each of the Comparative Examples 9 and 10 were insoluble in THF, thus evidencing that 1-hexene does not function as an effective chain transfer agent under these conditions.

Comparative Examples 11 to 13

Formic Acid as CTA

The procedures of Examples 1 to 5 were substantially repeated in these Comparative Examples 11 to 13 except that respectively 20 mole %, 10 mol % and 5 mol % of formic acid was used as a chain transfer agent in these Comparative Examples 11 to 13. In each of these Comparative Examples 11 to 13, the reaction product mostly solidified and only a portion of the solid sample was soluble in THF in Comparative Examples 11 and 12, and the polymer product in Comparative Example 13 dissolved in THF but the solution was hazy. The GPC results of the soluble portion of the polymeric samples revealed that very high $M_w$ were achieved with very high PDs under these polymerization conditions as follows: Comparative Example 11, $M_w$ 1,180,000, PD 9; Comparative Example 12, $M_w$ 2,02,000, PD 10; and Comparative Example 13, $M_w$ 850,000, PD 14. This clearly demonstrates that formic acid is not effective as a chain transfer agent under these conditions.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A reaction composition comprising:
    a compound of formula (I):

wherein
   a is an integer from 0 to 4;
   b is an integer from 0 to 2a+2;
   each R is hydrogen, halogen, methyl, ethyl, linear or branched $(C_3-C_6)$alkyl, substituted or unsubstituted $(C_3-C_7)$cycloalkyl, $(C_6-C_{10})$aryl, $(C_6-C_{10})$ aralkyl, methoxy, ethoxy, linear or branched $(C_3-C_6)$alkoxy, substituted or unsubstituted $(C_3-C_7)$ cycloalkoxy, $(C_6-C_{10})$aryloxy and $(C_6-C_{10})$ aralkyloxy;
one or more polycyclic olefin monomers; and
an organo-transition metal compound comprising a metal selected from the group consisting of nickel, palladium and platinum.

2. The composition of claim 1, wherein said one or more polycyclic olefin monomer is of formula (II):

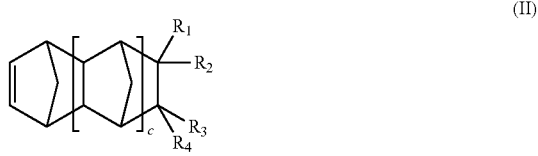

wherein:
   c is an integer 0, 1 or 2;
   $R_1$, $R_2$, $R_3$ and $R_4$ are the same or different and each independently of one another is selected from hydrogen, linear or branched $(C_1-C_{16})$alkyl, hydroxy$(C_1-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$ aryl, $(C_6-C_{10})$aryl$(C_1-C_3)$alkyl, perfluoro$(C_6-C_{10})$aryl, perfluoro(C$_6$-C$_{10}$)aryl(C$_1$-C$_3$)alkyl, di(C$_1$-C$_2$)alkylmaleimide(C$_3$-C$_6$)alkyl, di(C$_1$-C$_2$)alkylmaleimide(C$_2$-C$_6$)alkoxy(C$_1$-C$_2$)alkyl, hydroxy, (C$_1$-C$_{12}$)alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl, (C$_5$-C$_{10}$)heteroaryloxy(C$_1$-C$_3$)alkyl, (C$_6$-C$_{10}$)aryloxy, (C$_5$-C$_{10}$)heteroaryloxy, (C$_1$-C$_6$)acyloxy, where each of the aforementioned substituents are optionally substituted with a group selected from halogen or hydroxy.

3. The composition of claim 1, wherein said compound of formula (I) is selected from the group consisting of:
bicyclo[3.2.0]hept-6-ene;
2-methylbicyclo[3.2.0]hept-6-ene;
2,4-dimethylbicyclo[3.2.0]hept-6-ene;
2,4,6-trimethylbicyclo[3.2.0]hept-6-ene;
bicyclo[4.2.0]oct-7-ene;
2-methylbicyclo[4.2.0]oct-7-ene;
3-methylbicyclo[4.2.0]oct-7-ene;
2,3-dimethylbicyclo[4.2.0]oct-7-ene;
2,3,5-trimethylbicyclo[4.2.0]oct-7-ene;
2,3,4,5-tetramethylbicyclo[4.2.0]oct-7-ene;
bicyclo[5.2.0]non-8-ene;
2-methylbicyclo[5.2.0]non-8-ene;
2,5-dimethylbicyclo[5.2.0]non-8-ene;
bicyclo[6.2.0]dec-9-ene; and
2-methylbicyclo[6.2.0]dec-9-ene.

4. The composition of claim 1, wherein said organotransition metal compound is selected from the group consisting of:

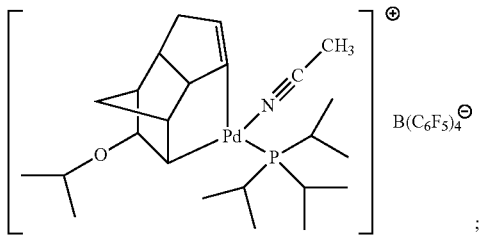
(IIIB)

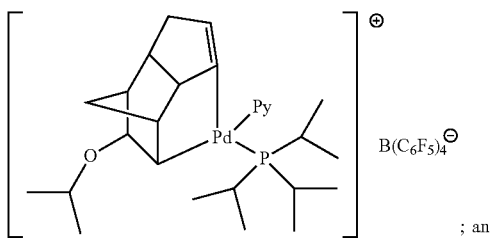
(IIIC)

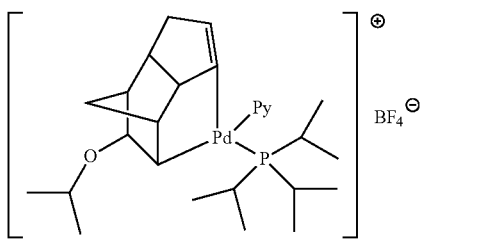
(IIID)

wherein Py is pyridine.

5. The composition of claim 1, wherein said organotransition metal compound is selected from the group consisting of:

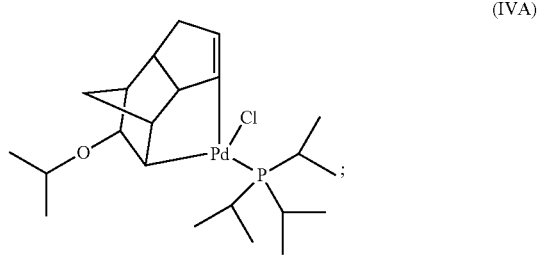
(IVA)

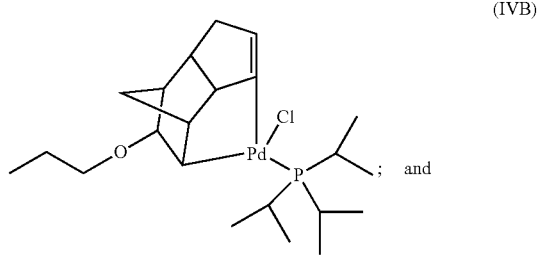
(IVB)

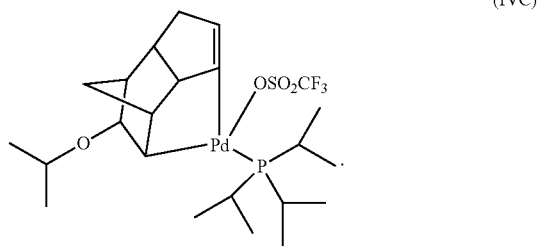
(IVC)

6. The composition of claim 1, wherein said organotransition metal compound is selected from the group consisting of:
trans-[Pd(NCMe)(OAc)(P(i-propyl)$_3$)$_2$]B(C$_6$F$_5$)$_4$,
trans-[Pd(NCC(CH$_3$)$_3$)(OAc)(P(i-propyl)$_3$)$_2$]B(C$_6$F$_5$)$_4$,
trans-[Pd(OC(C$_6$H$_5$)$_2$)(OAc)(P(i-propyl)$_3$)$_2$]B(C$_6$F$_5$)$_4$,
trans-[Pd(HOCH(CH$_3$)$_2$)(OAc)(P(i-propyl)$_3$)$_2$]B(C$_6$F$_5$)$_4$,
trans-[Pd(NCMe)(OAc)(P(cyclohexyl)$_3$)$_2$]B(C$_6$F$_5$)$_4$,
Pd(OAc)$_2$(P(cyclohexyl)$_3$)$_2$,
Pd(OAc)$_2$(P(i-propyl)$_3$)$_2$,
Pd(OAc)$_2$(P(i-propyl)$_2$(phenyl))$_2$,
trans-[Pd(NCMe)(OAc)(P(cyclohexyl)$_2$(t-butyl))$_2$]B(C$_6$F$_5$)$_4$, where OAc is OCOCH$_3$.

7. The composition of claim 1, wherein said organotransition metal compound is selected from the group consisting of:
nickel(2,4,6-trifluoromethylphenyl)$_2$;
nickel($\eta^6$-tolueneXpentafluorophenyl)$_2$;
nickel (tetrahydrofuran)$_2$(pentafluorophenyl)$_2$;
[(allyl)Ni(1,4-cyclooctadiene)]PF$_6$,
[(crotyl)Ni(1,4-cyclooctadiene)]PF$_6$; and
[(allyl)Ni(1,4-cyclooctadiene)]SbF$_6$.

8. The composition of claim 1 further comprising a compound of the formula (V):

$$M^{\oplus}Z^{\ominus} \qquad (V);$$

wherein
M$^{\oplus}$ is a cation selected from lithium, sodium, potassium, cesium, barium, ammonium and linear or branched tetra(C$_1$-C$_4$)alkyl ammonium;
Z$^{\ominus}$ is a weakly coordinating anion selected from selected from B(C$_6$F$_5$)$_4^{\ominus}$, B[C$_6$H$_3$(CF$_3$)$_2$]$_4^{\ominus}$, B(C$_6$H$_5$)$_4^{\ominus}$, [Al(OC(CF$_3$)$_2$C$_6$F$_5$)$_4$]$^{\ominus}$, BF$_4^{\ominus}$, PF$_6^{\ominus}$, AsF$_6^{\ominus}$, SbF$_6^{\ominus}$, (CF$_3$SO$_2$)N$^{\ominus}$ and CF$_3$SO$_3^{\ominus}$.

9. The composition of claim 8, wherein said compound of the formula (V) is selected from the group consisting of:
lithium tetrafluoroborate;
lithium triflate;
lithium tetrakis(pentafluorophenyl)borate;
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate; and
lithium methyltris(pentafluorophenyl)aluminate.

10. The composition of claim 2, wherein said one or more monomer of formula (II) is selected from the group consisting of:
bicyclo[2.2.1]hept-2-ene (NB);
norbornenyl-2-trifluoromethyl-3,3,3-trifluoropropan-2-ol (HFANB);
5-hexylbicyclo-[2.2.1]hept-2-ene (HexNB);
5-octylbicyclo[2.2.1]hept-2-ene (OctNB);
5-decylbicyclo[2.2.1]hept-2-ene (DecNB);
5-perfluorobutylbicyclo[2.2.1]hept-2-ene ($C_4F_9$NB);
5-phenethylbicyclo[2.2.1]hept-2-ene (PENB); and
2-(bicyclo[2.2.1]hept-5-en-2-yl)bicyclo[2.2.1]heptane (NBANB).

11. The composition of claim 2, wherein said one or more monomers of formula (II) are at least two distinct types of monomers of formula (II).

12. The composition of claim 2, wherein at least one of said one or more monomers of formula (II) is 5-decylbicyclo[2.2.1]hept-2-ene (DecNB) or 5-hexylbicyclo-[2.2.1]hept-2-ene (HexNB).

13. The composition of claim 2, wherein at least one of said one or more monomers of formula (II) is 5-phenethylbicyclo[2.2.1]hept-2-ene (PENB).

14. The composition of claim 2, wherein said compound of formula (I) is present in an amount of at least one mole percent of the total loading of the monomers of formula (II).

15. The composition of claim 2, wherein said compound of formula (I) is present in an amount of from one to ten mole percent of the total loading of the monomers of formula (II).

16. A method of mass polymerizing polycyclic olefin monomers comprising:
combining a compound of formula (I):

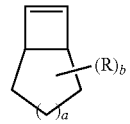

(I)

wherein
a is an integer from 0 to 4;
b is an integer from 0 to 2a+4;
each R is hydrogen, halogen, methyl, ethyl, ($C_3$-$C_6$) alkyl, substituted or unsubstituted ($C_3$-$C_7$)cycloalkyl, ($C_6$-$C_{10}$)aryl, ($C_6$-$C_{10}$)aralkyl, methoxy, ethoxy, ($C_3$-$C_6$)alkoxy, substituted or unsubstituted ($C_3$-$C_7$)cycloalkoxy, ($C_6$-$C_{10}$)aryloxy and ($C_6$-$C_{10}$) aralkyloxy;
with one or more polycyclic olefin monomers; and an organo-transition metal compound comprising a metal selected from the group consisting of nickel, palladium and platinum to form a mixture; and
polymerizing the mixture to form a polymer.

17. The method of claim 16, wherein said compound of formula (I) activates said organo-transition metal compound by forming a metal-hydride containing moiety.

18. The method of claim 16, wherein said organo-transition metal compound is a palladium compound.

19. The method of claim 16, which further comprises adding one or more compounds of the formula (V):

$$M^{\oplus}Z^{\ominus} \qquad (V);$$

wherein
$M^{\oplus}$ is a cation selected from lithium, sodium, potassium, cesium, barium, ammonium and linear or branched tetra($C_1$-$C_4$)alkyl ammonium;
$Z^{\ominus}$ is a weakly coordinating anion selected from selected from $B(C_6F_5)_4^{\ominus}$, $B[C_6H_3(CF_3)_2]_4^{\ominus}$, $B(C_6H_5)_4^{\ominus}$, $[Al(OC(CF_3)_2C_6F_5)_4]^{\ominus}$, $BF_4^{\ominus}$, $PF_6^{\ominus}$, $AsF_6^{\ominus}$, $SbF_6^{\ominus}$, $(CF_3SO_2)N^{\ominus}$ and $CF_3SO_3^{\ominus}$.

20. The method of claim 16, wherein said organo-transition compound is selected from the group consisting of:

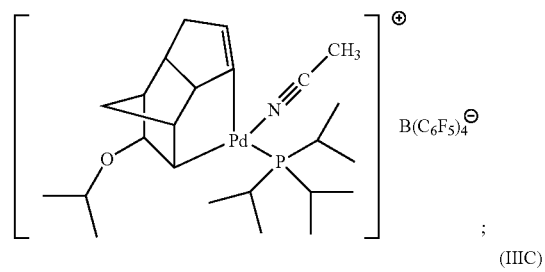

(IIIB)

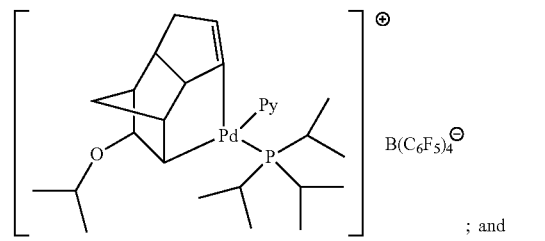

(IIIC)

; and (IIID)
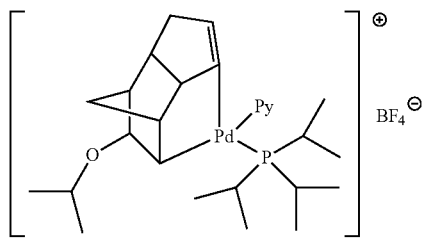
wherein Py is pyridine.
* * * * *